(12) United States Patent
Kanasugi et al.

(10) Patent No.: US 9,106,107 B2
(45) Date of Patent: Aug. 11, 2015

(54) CONTACTLESS POWER TRANSMISSION DEVICE PROVIDED IN A VEHICLE FOR CHARGING AN ELECTRONIC DEVICE

(75) Inventors: Katsumi Kanasugi, Kawaguchi (JP); Yoshihiro Mishio, Shioya-gun (JP); Hirokazu Kanahara, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 755 days.

(21) Appl. No.: 13/359,057

(22) Filed: Jan. 26, 2012

(65) Prior Publication Data

US 2012/0194125 A1 Aug. 2, 2012

(30) Foreign Application Priority Data

Feb. 1, 2011 (JP) .................................. 2011-019443
Nov. 9, 2011 (JP) .................................. 2011-245707

(51) Int. Cl.
*H02J 7/00* (2006.01)
*H02J 7/14* (2006.01)
*H02J 17/00* (2006.01)
(Continued)

(52) U.S. Cl.
CPC ................. *H02J 17/00* (2013.01); *H02J 7/025* (2013.01); *H02J 7/044* (2013.01)

(58) Field of Classification Search
USPC ......... 320/108, 107, 114, 115, 137, 101, 104; 455/579.5, 575.7, 579.9, 569.2, 41.1, 455/569.1, 575.1; 307/9.1, 10.4, 104, 10.1
See application file for complete search history.

(56) References Cited

U.S. PATENT DOCUMENTS 6,362,791 B1 * 3/2002 Patterson ...................... 343/702
6,942,267 B1 * 9/2005 Sturt .......................... 296/24.34
(Continued)

FOREIGN PATENT DOCUMENTS

JP  10-090335  4/1998
JP  2004-007851  1/2004
(Continued)

OTHER PUBLICATIONS

Japanese Office Action, Application No. 2011-245707, dated Feb. 19, 2013, 5 pages.
(Continued)

*Primary Examiner* — Edward Tso
*Assistant Examiner* — Alexis A Boateng
(74) *Attorney, Agent, or Firm* — Rankin, Hill & Clark LLP

(57) ABSTRACT

A contactless power transmission device which transmits electric power in a contactless way includes: a power transmission section which transmits electric power using a primary coil; a power receiving section which is provided in a radio communication device and receives electric power using a secondary coil that is electromagnetically coupled with the primary coil; a housing which shields an electromagnetic wave, in which the power transmission section is provided, and which forms a closed space where the radio communication device is housed; and a housing antenna section which is provided in the housing and transmits a first communication signal to the outside of the housing, or transmits a second communication signal to the inside of the housing, the first communication signal being emitted from the radio communication device housed inside the housing, the second communication signal being emitted from the radio communication device housed outside the housing.

11 Claims, 3 Drawing Sheets

(51) Int. Cl.
*H02J 7/04* (2006.01)
*H02J 7/02* (2006.01)

(56) References Cited

U.S. PATENT DOCUMENTS

| | | | |
|---|---|---|---|
| 7,705,558 B2* | 4/2010 | Silverman | 320/108 |
| 7,715,187 B2* | 5/2010 | Hotelling et al. | 361/679.41 |
| 2002/0158512 A1* | 10/2002 | Mizutani et al. | 307/9.1 |
| 2005/0068019 A1 | 3/2005 | Nakamura et al. | |
| 2005/0156560 A1* | 7/2005 | Shimaoka et al. | 320/107 |
| 2006/0261778 A1* | 11/2006 | Elizalde Rodarte | 320/114 |
| 2008/0001572 A9 | 1/2008 | Baarman et al. | |
| 2008/0297103 A1* | 12/2008 | Windsor | 320/101 |
| 2009/0305746 A1* | 12/2009 | Pursche et al. | 455/569.2 |
| 2011/0148352 A1* | 6/2011 | Wang et al. | 320/108 |
| 2011/0156637 A1* | 6/2011 | Thorsell et al. | 320/108 |
| 2013/0147429 A1* | 6/2013 | Kirby et al. | 320/108 |
| 2013/0234481 A1* | 9/2013 | Johnson | 297/217.3 |
| 2013/0234660 A1* | 9/2013 | Moriguchi | 320/108 |

FOREIGN PATENT DOCUMENTS

| | | |
|---|---|---|
| JP | 2005-110412 | 4/2005 |
| JP | 2006-121271 | 5/2006 |
| JP | 2007-104868 | 4/2007 |
| JP | 2012-019648 | 1/2012 |
| WO | 2010093724 | 8/2010 |

OTHER PUBLICATIONS

Chinese Office Action with English Translation of Search Report, Application No. 201210024694.3 dated Jan. 13, 2014, 9 pages.
Japanese Office Action and English Translation dated Dec. 18, 2012, Application No. 2011-245707, 6 pages.

* cited by examiner

CONTACTLESS POWER TRANSMISSION DEVICE PROVIDED IN A VEHICLE FOR CHARGING AN ELECTRONIC DEVICE

BACKGROUND OF THE INVENTION

1. Field of the Invention

The present invention relates to a contactless power transmission device.

Priority is claimed on Japanese Patent Application No. 2011-019443, filed Feb. 1, 2011, and Japanese Patent Application No. 2011-245707, filed Nov. 9, 2011, the content of which is incorporated herein by reference.

2. Description of Related Art

As a charging device for radio communication apparatuses, such as mobile phones, a contactless power transmission device is known.

The contactless power transmission device transmits AC power of a certain frequency from a power transmission device to a power receiving device, which is provided or fixed to a radio communication device, using electromagnetic induction or the like.

For example, U.S Patent Application Publication No. 2008/0001572 discloses a contactless power transmission device mounted in a vehicle.

However, when transmitting electric power in order to charge a radio communication device using a contactless power transmission device mounted in a vehicle, some of the AC power of a frequency used for power transmission or a harmonic or subharmonic of the AC power becomes an electromagnetic wave, an alternating magnetic field, or an alternating electric field and is input as a noise to a neighboring device for a vehicle through the air or a connection cable.

As a result, there has been a problem in that the noise causes degradation of S/N (SN ratio), a reduction in the receiving sensitivity, and the like when a device which transmits or receives information receives the information through radio communication with the outside of the vehicle or radio communication with the inside of the vehicle.

For example, since a harmonic frequency component (for example, approximately 1 MHz in a tenth-order harmonic) in contactless power transmission overlaps an AM radio frequency band (0.5 to 1.6 MHz), it appears as radio noise.

In addition, the harmonic frequency component in contactless power transmission may affect radio communication (one-seg reception or communication with an in-vehicle device using Bluetooth) of a radio communication device being charged.

SUMMARY OF THE INVENTION

Therefore, it is an object of the invention to provide a contactless power transmission device capable of ensuring the communication of a radio communication device being charged while preventing unnecessary electromagnetic radiation to the outside during charging of the radio communication device.

In order to solve the above-described problems, the contactless power transmission device according to the present invention adopted the following configurations.

According to an aspect of one embodiment of the invention, a contactless power transmission device includes: a power transmission section which transmits electric power using a primary coil; a power receiving section which is provided in a radio communication device and receives electric power using a secondary coil that can be electromagnetically coupled with the primary coil; a housing which shields an electromagnetic wave, in which the power transmission section is provided, and which forms a closed space where the radio communication device is housed; and a housing antenna section which is provided in the housing and transmits a first communication signal to the outside of the housing, or transmits a second communication signal to the inside of the housing, the first communication signal being emitted from the radio communication device housed inside the housing, the second communication signal being emitted from the radio communication device housed outside the housing.

Through the above-described configuration, when charging the radio communication device in a state where the radio communication device is housed in the housing of the contactless power transmission device, it is possible to reduce unnecessary electromagnetic radiation to the outside of the housing at the time of power transmission. As a result, an adverse effect of the electromagnetic wave on an external device can be reduced.

In addition, by the housing antenna section, communication of the radio communication device can be ensured even when the radio communication device is charged.

In the contactless power transmission device according to the aspect of the embodiment of the invention, the housing antenna section is formed by an internal antenna section provided inside the housing and an external antenna section which is connected to the internal antenna section and is provided outside the housing.

In addition, it is preferable that the internal antenna section be provided so as to be disposed at a position close to an antenna of the radio communication device when the radio communication device is housed in the housing.

Through the above-described configuration, a lowering in transmission and reception performance of the radio communication device can be prevented. As a result, satisfactory transmission and reception performance can be ensured.

In the contactless power transmission device according to the aspect of the embodiment of the invention, it is preferable that the external antenna section be provided at a position which is outside the housing and is near the housing.

Through the above-described configuration, it is possible to obtain satisfactory sensitivity in communication between the radio communication device being charged and a device provided near the housing.

In the contactless power transmission device according to the aspect of the embodiment of the invention, it is preferable that a structural material, which makes the attenuation of electromagnetic waves in a frequency band for power transmission larger than the attenuation of electromagnetic waves in a frequency band used for communication by the radio communication device, be used as a shielding structure material which shields an electromagnetic wave in the housing.

Through the above-described configuration, it is possible to obtain the magnetic field shielding effect in a low frequency band and also to reduce the attenuation of electromagnetic waves in a high frequency band. As a result, a lowering in the reception sensitivity of the radio communication device can be suppressed.

DETAILED DESCRIPTION OF THE INVENTION

Hereinafter, a contactless power transmission device according to an embodiment of the invention will be described with reference to FIGS. 1 to 4.

First Embodiment

First, a contactless power transmission device according to a first embodiment of the invention will be described with reference to FIGS. 1 to 3.

Figure 1:
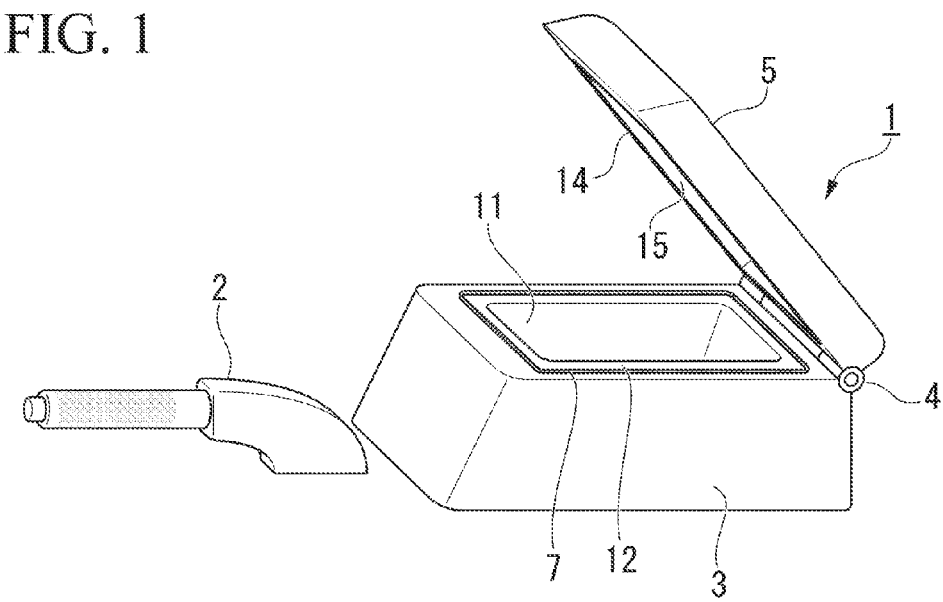
FIG. 1 is a perspective view showing a console box of a vehicle in which a contactless power transmission device according to an embodiment of the invention is provided.

FIG. 1 is a perspective view showing the appearance of a console box 1 and a parking brake 2 provided between the driver's seat and the passenger seat of a vehicle. In the present embodiment, a contactless power transmission device is provided in the console box 1.

The console box 1 is provided behind the parking brake 2 in the vehicle and is configured to include a box body 3, which is formed of resin and is fixed to the vehicle body, and a lid 5, which is formed of resin and is fixed so as to be able to be opened and closed in the vertical direction through a hinge 4 provided at the back side of the box body 3.

Figure 2:
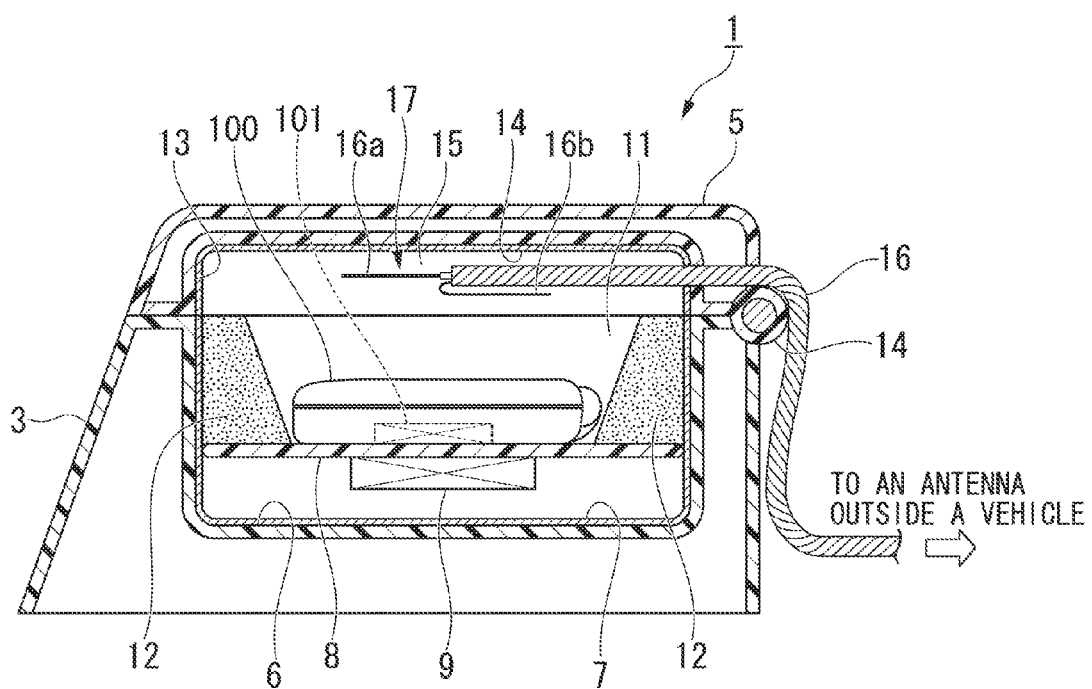
FIG. 2 is a sectional view of the console box of the vehicle, in which the contactless power transmission device is provided, in the first embodiment.

As shown in FIG. 2, a recess 6 which is open upward is formed in the box body 3, and a shield body 7 (shield structure) which can shield an electromagnetic wave is fixed to the entire inside surface of the recess 6 without a gap.

A separation plate 8, which is formed of resin and separates the space formed in the shield body 7 up and down, is provided inside the shield body 7. A primary coil 9, which is a power transmission section that transmits electric power, is fixed to the back surface side of the separation plate 8.

The primary coil 9 is connected to a power source of the vehicle through a signal transmission circuit provided in the shield body 7.

The space above the separation plate 8 in the shield body 7 is a housing space 11 for housing a mobile phone 100 which is a radio communication device.

A positioning member 12 formed of urethane resin is fixed to the inner wall surface of the shield body 7 and the upper surface of the separation plate 8 so that the mobile phone 100 is disposed immediately above the primary coil 9 when the mobile phone 100 is placed on the separation plate 8 of the housing space 11.

The positioning member 12 has a structure where a downward inclined surface is formed so that the mobile phone 100 can be easily inserted and positioning between the primary coil 9 and a secondary coil 101, which will be described later, can be easily performed.

In addition, the positioning member 12 may be provided so as to be detachable from the shield body 7 and the separation plate 8.

In this case, since only the positioning member 12 can be replaced according to the shape of the mobile phone 100, the positioning accuracy of the primary coil 9 and the secondary coil 101 can be ensured.

In addition, this is convenient since a wide range of housing space inside the console box 1 can be used when the mobile phone 100 is not charged.

The secondary coil 101 which is a power receiving section is provided in the mobile phone 100, so that electromagnetic coupling between the primary coil 9 and the secondary coil 101 is possible when the mobile phone 100 is housed in the housing space 11.

In addition, the mobile phone 100 can be charged by transmitting electric power from the primary coil 9 to the secondary coil 101 in a contactless way using electromagnetic induction.

A recess 13 which is open downward is formed in the lid 5, and a shield body 14 (housing) which can shield an electromagnetic wave is fixed to the entire inside surface of the recess 13 without a gap.

A housing space 15 is provided inside the shield body 14. Accordingly, an opening of the shield body 14 of the lid 5 and an opening of the shield body 7 of the box body 3 match each other when the lid 5 is closed, so that the housing space 11 of the box body 3 and the housing space 15 of the lid 5 form one closed space.

In addition, a coaxial cable (housing antenna section) 16 is fixed to the back of the lid 5 so as to pass through the shield body 14 and also pass through the inside and the outside of the lid 5.

One end side of the coaxial cable 16 is inserted in the housing space 15 provided in the lid 5 and is connected to an internal antenna (internal antenna section) 17 fixed to the inside surface of the lid 5.

Figure 3:
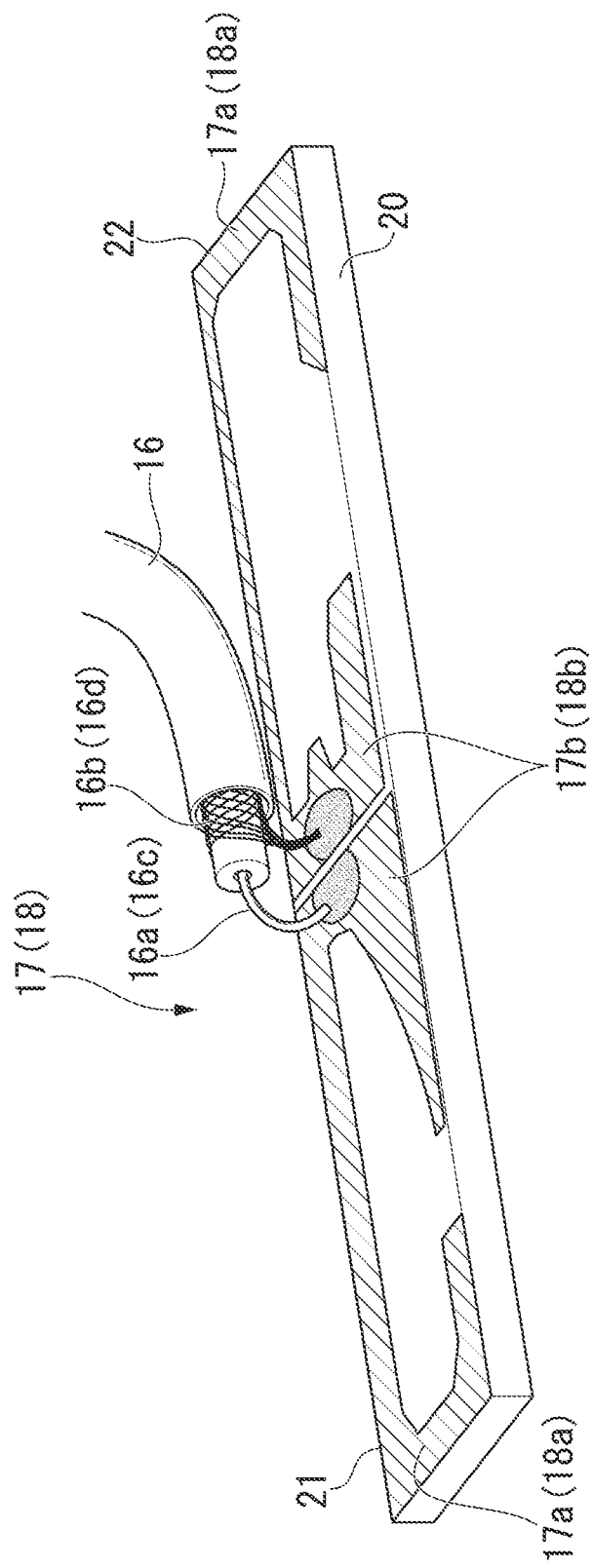
FIG. 3 is a view showing the details of an antenna.

FIG. 3 is a view showing the details of the internal antenna 17 which is simply shown in FIG. 2.

The internal antenna 17 includes a substrate 20 fixed to the lid 5 and a pair of antenna patterns 21 and 22 with a predetermined shape formed of copper foil or the like on the surface of the substrate 20. An inner conductor 16a of the coaxial cable 16 is connected to one antenna pattern 21, and an outer conductor 16b of the coaxial cable 16 is connected to the other antenna pattern 22.

In addition, the antenna patterns 21 and 22 have a balun function of a microstrip line structure for impedance matching between a portion 17a having antenna characteristics for a mobile phone and a portion 17b having antenna characteristics for Bluetooth.

The internal antenna 17 is disposed so as to be located immediately above the mobile phone 100 housed in the housing space 11 of the box body 3 when the lid 5 is closed.

That is, the internal antenna 17 is provided so as to be disposed at the position close to an antenna of the mobile phone 100 housed in the console box 1 (housing).

The other end of the coaxial cable 16 pulled to the outside of the lid 5 is an external antenna and is connected to an antenna outside a vehicle or an in-vehicle antenna (not shown).

The antenna outside a vehicle is an antenna which is fixed to the roof or window glass of a vehicle so that an electric wave from the outside of the vehicle can be received, and the in-vehicle antenna is an antenna for communication with a device inside the vehicle.

When charging the mobile phone 100 using the contactless power transmission device provided in the console box 1 configured in this way, the mobile phone 100 is housed in the housing space 11 provided in the box body 3 and the lid 5 is closed and then electric power is transmitted from the primary coil 9 to the secondary coil 101 using electromagnetic induction so that the mobile phone 100 is charged.

Since the console box 1 has such a configuration, the primary coil 9 and the secondary coil 101 can be housed in the closed space where an electromagnetic wave is shielded by the shield bodies 7 and 14. Accordingly, it is possible to reduce unnecessary electromagnetic radiation to the outside of the console box 1 at the time of contactless power transmission.

As a result, an adverse effect (for example, radio noise or one-seg receiving failure) of the electromagnetic wave on a device outside the console box 1 can be reduced.

In addition, for the mobile phone 100 being charged, the internal antenna 17 is disposed at the position near the mobile phone 100, and this internal antenna 17 is connected to an antenna outside the vehicle or an in-vehicle antenna through the coaxial cable 16. Accordingly, even when the mobile phone 100 is charged in a state where the mobile phone 100 is sealed in the console box 1, communication between the mobile phone 100 and the external device can be ensured.

Thus, in this invention, a communication signal emitted from the mobile phone 100 housed inside the console box 1 is transmitted to the outside of the housing. Additionally, a communication signal emitted from the mobile phone 100 housed outside the console box 1 is transmitted to the inside of the console box 1.

Second Embodiment

Next, a contactless power transmission device according to a second embodiment of the invention will be described with reference to FIG. 4.

The contactless power transmission device according to the second embodiment is also provided in the console box 1 of the vehicle as in the first embodiment.

The only different point of the contactless power transmission device according to the second embodiment and the contactless power transmission device according to the first embodiment is a form of the external antenna of the coaxial cable 16.

Also in the second embodiment, the coaxial cable 16 is fixed so as to pass through the shield body 14 and also pass through the inside and the outside of the lid 5, and one end of the coaxial cable 16 is inserted in the housing space 15 of the lid 5 and is connected to the internal antenna 17 in the housing space 15, as in the first embodiment.

On the other hand, in the second embodiment, the coaxial cable 16 passes through a top plate 5a of the lid 5, and the other end of the coaxial cable 16 pulled to the outside of the lid 5 is connected to an external antenna (external antenna section) 18 fixed to the top plate 5a.

Figure 4:
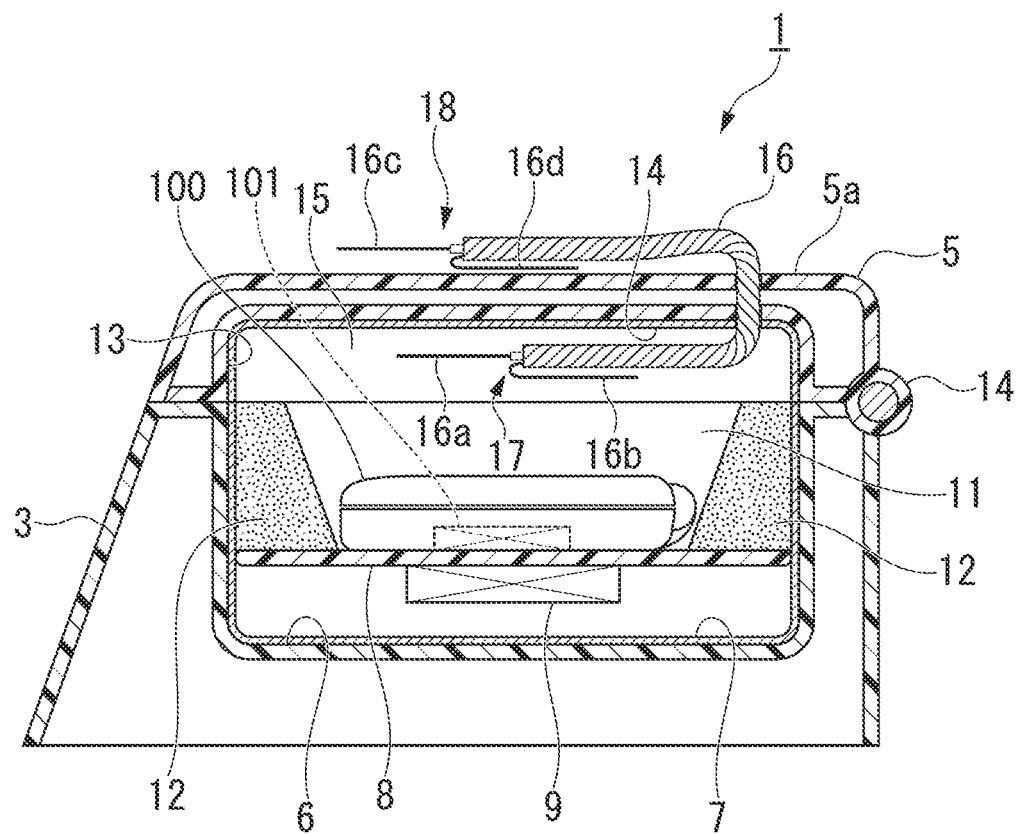
FIG. 4 is a sectional view of a console box of a vehicle, in which a contactless power transmission device is provided, in a second embodiment.

In addition, in FIG. 4, the internal antenna 17 and the external antenna 18 are simply shown.

The structure of the external antenna 18 is the same as that of the internal antenna 17 and accordingly, the structure of the external antenna 18 will be described with reference to FIG. 3. The external antenna 18 includes a substrate 20 fixed to the top plate 5a of the lid 5 and a pair of antenna patterns 21 and 22 with a predetermined shape formed of copper foil or the like on the surface of the substrate 20. An inner conductor 16c of the coaxial cable 16 is connected to one antenna pattern 21, and an outer conductor 16d of the coaxial cable 16 is connected to the other antenna pattern 22.

In addition, the antenna patterns 21 and 22 have a balun function of a microstrip line structure for impedance matching between a portion 18a having antenna characteristics for a mobile phone and a portion 18b having antenna characteristics for Bluetooth.

That is, in the second embodiment, the external antenna 18 is provided at the position which is outside the console box 1 (housing) and is near the console box 1.

This is a point of difference between the first and second embodiments.

Since the other configuration is the same as that of the device according to the first embodiment, the same reference numerals are given to the same components and an explanation thereof is omitted here.

Also in the second embodiment, it is possible to reduce unnecessary electromagnetic radiation to the outside of the console box 1 at the time of contactless power transmission. As a result, an adverse effect of the electromagnetic wave on a device outside the console box 1 can be reduced.

In addition, for the mobile phone 100 being charged, the internal antenna 17 is disposed at the position near the mobile phone 100, and this internal antenna 17 is connected to the external antenna 18 on the top plate 5a of the lid 5 through the coaxial cable 16. Accordingly, communication between the mobile phone 100 and the external device can be ensured in the same manner as when the mobile phone 100 is placed on the console box 1.

Thus, in this invention, a communication signal emitted from the mobile phone 100 housed inside the console box 1 is transmitted to the outside of the housing, additionally, a communication signal emitted from the mobile phone 100 housed outside the console box 1 is transmitted to the inside of the console box 1.

In the second embodiment, when the mobile phone 100 and an AV device or a navigational device in the vehicle communicate with each other through Bluetooth or a wireless LAN, for example, the distance between these devices and the external antenna 18 can be shortened. As a result, it is possible to obtain good sensitivity.

By the way, the frequency of an electric wave for information communication between a radio communication device and an external device is a 1 GHz band in mobile phone communication, a several gigahertz band in Bluetooth, and a several gigahertz band in a wireless LAN, for example, while the alternating magnetic field frequency for power transmission is usually hundreds of kilohertz or tens of megahertz if it is high.

Therefore, taking into consideration a band difference between the frequency of an electric wave for information communication between the radio communication device and the external device and the alternating magnetic field frequency for power transmission, the shield bodies 7 and 14 in the first or second embodiment are formed of a material whose alternating magnetic field permeability in a high frequency band is lower than its alternating magnetic field permeability in a low frequency band, in other words, a material (for example, permalloy) which makes the attenuation of electromagnetic waves in a high frequency band smaller than that in a low frequency band.

In this case, it is possible to reduce the attenuation of electromagnetic waves in a high frequency band used for communication while shielding electromagnetic waves in a low frequency due to power transmission.

For example, if an electromagnetic steel plate or permalloy is used as a structural material of the shield bodies 7 and 14 when an alternating magnetic field of hundreds of kilohertz is used for power transmission, the magnetic field shielding effect can be obtained in a low frequency region without lowering relatively largely the receiving sensitivity of the mobile phone 100 in a high frequency region since the magnetic field shielding effect is high in the low frequency region but is low in the high frequency region.

Other Embodiments

In addition, the invention is not limited to each of the embodiments described above.

For example, when the lid 5 is closed, the internal antenna 17 may be made to be in direct contact with the mobile phone 100 housed in the housing space 11.

Although the case where the contactless power transmission device is provided in the console box 1 of the vehicle has been described in each of the embodiments, the contactless power transmission device may also be formed as an independent housing instead of being used together with other devices without being particularly limited to this.

In addition, the contactless power transmission device according to each embodiment of the invention is not limited to the vehicle.

In addition, the radio communication device is not limited to the mobile phone.

While preferred embodiments of the invention have been described and illustrated above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A contactless power transmission device which transmits electric power in a contactless way, comprising:
    a power transmission section which transmits electric power using a primary coil;
    a power receiving section which is provided in a radio communication device and receives electric power using a secondary coil that is electromagnetically coupled with the primary coil;
    a housing which shields an electromagnetic wave, in which the power transmission section is provided, and which forms a closed space where the radio communication device is housed; and
    a housing antenna section which is provided in the housing and transmits a first communication signal to the outside of the housing, or transmits a second communication signal to the inside of the housing, the first communication signal being emitted from the radio communication device housed inside the housing, the second communication signal being emitted from the radio communication device housed outside the housing, wherein
    the housing includes a box body which is fixed inside a vehicle body and a lid which is fixed to the box body so as to open and close,
    the housing antenna section includes an internal antenna section which is provided on an inside surface of the lid and an external antenna section which is connected to the internal antenna section and provided outside the housing, and
    the power transmission section is fixed to the box body.

2. The contactless power transmission device according to claim 1, wherein
    the internal antenna section is provided so as to be disposed at a position close to an antenna of the radio communication device when the radio communication device is housed in the housing.

3. The contactless power transmission device according to claim 2, wherein
    the external antenna section is provided at a position which is outside the housing and is near the housing.

4. The contactless power transmission device according to claim 1, wherein
    a structural material which makes the attenuation of electromagnetic waves in a frequency band for power transmission larger than the attenuation of electromagnetic waves in a frequency band used for communication by the radio communication device is used as a shielding structure material which shields an electromagnetic wave in the housing.

5. The contactless power transmission device according to claim 2, wherein
    a structural material which makes the attenuation of electromagnetic waves in a frequency band for power transmission larger than the attenuation of electromagnetic waves in a frequency band used for communication by the radio communication device is used as a shielding structure material which shields an electromagnetic wave in the housing.

6. The contactless power transmission device according to claim 3, wherein
    a structural material which makes the attenuation of electromagnetic waves in a frequency band for power transmission larger than the attenuation of electromagnetic waves in a frequency band used for communication by the radio communication device is used as a shielding structure material which shields an electromagnetic wave in the housing.

7. The contactless power transmission device according to claim 1, wherein
    the internal antenna section is disposed so as to be located immediately above the radio communication device housed inside the housing when the lid is closed.

8. The contactless power transmission device according to claim 1, further comprising:
    a positioning member which is provided inside the housing so that the radio communication device is disposed immediately above the primary coil, wherein
    the positioning member forms a downward inclined surface on an inner wall surface of the housing.

9. The contactless power transmission device according to claim 8, wherein
    the positioning member is provided so as to be detachable from the housing.

10. The contactless power transmission device according to claim 1, further comprising:
    a shield body which is fixed to an entire inside surface of the housing, the shield body shielding the electromagnetic wave in the housing, and the shield body being formed of metal.

11. The contactless power transmission device according to claim 1, wherein
    the housing antenna section is a coaxial cable comprising the internal antenna section and the external antenna section,
    the internal antenna includes a substrate fixed to the lid and a pair of antenna patterns with a predetermined shape on the surface of the substrate, and
    an inner conductor of the coaxial cable is connected to one antenna pattern, and an outer conductor of the coaxial cable is connected to the other antenna pattern.

* * * * *